United States Patent [19]
Szczepanski

[11] Patent Number: 5,567,757
[45] Date of Patent: Oct. 22, 1996

[54] LOW SPECIFIC GRAVITY BINDER FOR MAGNETS

[75] Inventor: Thomas R. Szczepanski, North Royalton, Ohio

[73] Assignee: RJF International Corporation, Fairlawn, Ohio

[21] Appl. No.: 503,870

[22] Filed: Jul. 18, 1995

[51] Int. Cl.$^6$ .............................. C08K 3/10; C08L 23/04; H01F 1/117; H01F 1/113

[52] U.S. Cl. .................. 524/435; 524/264; 524/269; 524/403; 525/101; 525/106; 525/222; 252/62.54

[58] Field of Search ..................... 525/222, 101, 525/106; 524/403, 435, 264, 269; 252/62.54

[56] References Cited

U.S. PATENT DOCUMENTS

| | | |
|---|---|---|
| Re. 28,688 | 1/1976 | Cook ........................ 264/230 |
| 3,073,371 | 1/1963 | Leeper . |
| 3,328,482 | 6/1967 | Northrup et al. . |
| 3,347,815 | 10/1967 | Short et al. . |
| 3,742,084 | 6/1973 | Olyphant, Jr. et al. . |
| 3,979,356 | 9/1976 | Walters . |
| 4,211,729 | 7/1980 | Marquardt et al. ............. 525/106 |
| 4,894,408 | 1/1990 | Hazelton ....................... 525/222 |
| 5,286,576 | 2/1994 | Srail ............................. 524/416 |
| 5,369,156 | 11/1994 | Lesage .......................... 524/68 |

FOREIGN PATENT DOCUMENTS

| | | |
|---|---|---|
| 020580 | 7/1975 | Japan . |
| 065036 | 6/1981 | Japan ........................... 525/222 |
| 214206 | 12/1984 | Japan ......................... 252/62.54 |
| 186803 | 7/1992 | Japan . |

OTHER PUBLICATIONS

Ionchenkov "Production Technology and Quality Control of Elastic", *Zhurnal Khimi* 1980 pp. 50–54.

*Primary Examiner*—David Buttner
*Attorney, Agent, or Firm*—Hudak & Shunk Co., L.P.A.

[57] ABSTRACT

Magnetic or magnetizable composites contain ferrite or rare earth particles in a lightweight flexible binder blend of a semicrystalline polyolefin dispersed within a rubbery matrix. Small but effective amounts of lubricating agents are utilized to improve the processability of the composite which generally lacks any halogen and is environmentally friendly.

14 Claims, No Drawings

LOW SPECIFIC GRAVITY BINDER FOR MAGNETS

FIELD OF INVENTION

The present invention relates to a low specific gravity, flexible polymeric binder composition which has good processability and is suitable for incorporating high loadings of magnetic or magnetizable particles therein. More specifically, the present invention relates to a halogen free, low viscosity flexible magnet binder which places low power loads on processing equipment.

BACKGROUND

Heretofore, magnetic binder compositions have had high processing viscosities, high specific gravities and contain halogens, especially chlorine, which are undesirable with regard to environmental aspects. For example, chlorosulfonated polyethylene and polyepichlorohydrin have been utilized as binders to achieve high loadings of magnetic particles but are undesirable due to their high specific gravity and high chlorine content. Chlorosulfonated polyethylene is further undesirable inasmuch as during the preparation thereof chloroform and carbon tetrachloride are utilized as solvents.

SUMMARY OF THE INVENTION

The present invention relates to a low specific gravity, flexible polymeric blend which can serve as a binder for incorporating high amounts of magnetizable or magnetic ferrite or rare earth particles. The blend contains a semicrystalline polyolefin polymer such as an ethylene-vinyl acetate copolymer generally as a dispersed phase with a continuous or a matrix phase of a rubbery polymer such as polyisobutylene. Small amounts of a lubricant such as silicone rubber are utilized to impart favorable processing properties as well as suitable viscosities.

DETAILED DESCRIPTION OF THE INVENTION

The semicrystalline polyolefin polymer of the present invention can be various polymers such as polybutene, polypentenamer, or preferably ethylene-vinyl ester copolymer, and the like. By the term semicrystalline it is meant that the polymer or copolymer generally has a melt index according to ASTM D 1238 of from about 0.5 to about 20 and preferably from about 2.5 to about 12 grams/10 minutes. Melting indexes above 20 are generally too soft and readily flow whereas melt indexes below 0.5 are generally too tough and flow too slowly. Often a blend of two or more semicrystalline polyolefin polymers are utilized to achieve a desired melt index. The semicrystalline polymers generally impart strength, stiffness, and thermal resistance to the low specific gravity polymeric blend.

The vinyl ester of the ethylene-vinyl ester copolymer generally has a total of from 2 to 6 carbon atoms therein and includes vinyl acetate, vinyl propionate, vinyl butyrate, and the like with vinyl acetate being preferred. The weight of the vinyl ester portion of the copolymer, i.e., repeat units, is generally from about 5 to about 40 percent and preferably from about 7 to about 30 percent. Thus the weight of the ethylene portion of the copolymer is from about 60 to about 95 percent and preferably from about 70 to 93 percent by weight. Suitable commercially available ethylene-vinyl ester copolymers include Elvax 550 and 750 from DuPont, UE 649-04 from Quantum and DQDA 1868 NT 7 from Union Carbide.

The continuous rubbery polymer generally has a high molecular weight in order to provide for high volume loadings of the magnetic or magnetizable particles. Suitable rubbers include polyisobutylene (preferred), nitrile rubber, ethylene-propylene rubbers (EPR), and ethylene-propylene-diene rubbers (EPDM). The viscosity average molecular weight of such polymers is generally from about 800,000 to about 3,000,000, desirably from about 1.5 million to about 2.6 million, and preferably from about 1.8 million to about 2.4 million.

The polyisobutylene preferably has only terminal unsaturation and therefore does not contain small amounts of a conjugated diene such as isoprene, as in butyl rubber. The softening point of the polyisobutylene is from about 110° C. to about 150° C. and desirably from about 120° C. to about 140° C. A preferred polyisobutylene is Vistanex MML-140 manufactured by Exxon. The polyisobutylenes are preferred as the rubbery polymer phase.

The nitrile rubbers are known to the art as well as to the literature and generally are copolymers of acrylonitrile or esters thereof with a conjugated diene monomer having from about 4 to about 8 carbon atoms with from 4 to 6 carbon atoms being preferred. Examples of suitable conjugated diene monomers include butadiene, isoprene, hexadiene, and the like with butadiene being preferred. The amount of such conjugated diene is generally from about 55 percent to about 85 percent and preferably from about 60 percent to about 80 percent by weight based upon the total weight of the nitrile rubber. The amount of acrylonitrile is generally from about 15 to about 45 percent and desirably from about 20 to about 40 percent by weight based upon the total weight of the nitrile rubber.

EPR and EPDM polymers generally contain ethylene repeat units in an amount of from about 40 to about 90 percent by weight. The amount of diene repeat units in EPDM is generally up to about 4 mole percent. A suitable EPR copolymer is Vistalon 707 made by Exxon Chemicals, which has a Mooney viscosity (ASTM D-1646) at 125° C. of about 20 to about 30.

The one or more rubbery polymers are desirably compatible with the semicrystalline polymer and the total amount thereof is generally from about 45 to about 75, desirably from about 50 to about 70, and preferably from about 55 to about 65 percent by weight based upon the total weight of the one or more rubbery polymers and the one or more semi-crystalline polymers. Accordingly, the amount of the semicrystalline polymer is generally from about 25 to about 55 percent by weight, desirably from about 30 to about 50 percent by weight, and preferably from about 35 to about 45 percent by weight.

The low specific gravity, flexible polymer blend of the present invention can be formed by generally heating the semicrystalline polymer and the rubbery polymer as well as the below noted lubricants to a temperature above the softening point of the semicrystalline polymer but below the onset of degradation and mixing the same in any conventional mixing apparatus such as a Banbury, a two-roll mill, and the like. Suitable mixing temperatures are often from about 90° C. to about 150° C., and desirably from about 115° C. to about 145° C. If the rubber contains unsaturation therein such as nitrile rubber, EPDM, etc., it is blended with the semicrystalline polyolefin but generally not cured inasmuch as a thermoplastic blend is desired.

An important aspect of the present invention is to utilize lubricant additives to improve the processability, that is, low processing viscosities, mill release, and flow of the blend. Lubricant additives which do not bleed out of the blend are desired. Suitable lubricants include various silicone elastomers such as polysiloxanes which have the repeat unit

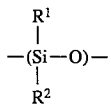

wherein $R^1$ and $R^2$ independently, is an alkyl group having from 1 to 4 carbon atoms with methyl being preferred. More preferred are various polysiloxanes wherein a small amount of the $R^1$ and/or $R^2$, groups generally randomly dispersed throughout the polymer, contain $C_1$ to $C_5$ vinyl groups such as methyl vinyl so that the silicone polymer can be cured. An example of such a specific polymer is Silplus SE6250, or SE6350, i.e., poly(dimethyl methylvinyl siloxane), manufactured by General Electric which also includes small amounts, for example, from about 2 to about 15 percent by weight of silica gel therein, and the like.

Lubricants also include various metal salts of fatty acids such as saturated fatty acids having from about 12 to about 25 carbon atoms as well as unsaturated acids having from about 12 to about 30 carbon atoms with specific examples including the sodium, potassium, magnesium, calcium, zinc, etc., salts of palmitic acid, stearic acid, oleic acid, linoleic acid, and the like. Another group of lubricants include various waxes which are esters formed from long chained fatty acids usually containing from 15 to 40 carbon atoms and desirably 24 to 28 carbon atoms with long chained alcohols, generally primary, containing from about 10 to about 50 carbon atoms and desirably from about 16 to about 36 carbon atoms. Yet another class of suitable waxes include the various low molecular weight paraffinic waxes which optionally can be partially oxidized such as the various crystalline or micro crystalline polyethylene wax such as AC629 A produced by Allied Signal. Still other waxes include various polymeric complex esters, ester waxes of the glycerol type, and the like. The various silicone elastomers are preferred.

The amount of the lubricant is generally an effective amount to provide ease of processability of the blends or composites of the present invention as by imparting suitable viscosities thereto during processing. The lubricants of the present invention have been found to improve processability evidently by wetting out or coating the surfaces of the rubber polymer as well as the semicrystalline polymer. Such amounts are generally from about 0.25 to about 5 or 8 parts by weight, desirably from about 0.75 to about 3 parts by weight, and preferably from about 1 to about 2 parts by weight per 100 parts by weight of the rubbery polymer and the semicrystalline polyolefin.

The binder composition of the present invention can also include various additives such as antidegradants, antioxidants, heat stabilizers, other processing aids, fillers, and the like. Examples of antidegradants include "Vanox" ZMTI, zinc 2-mercaptotoluimidazole antioxidant powder, specific gravity=1.69, melting point 300° C., sold by RT Vanderbilt Company, Inc., Norwalk, Conn.; and "Naugard" 445, a 4,4'-di(alpha)alphadiphenyl amine antioxidant, specific gravity=1.14, melting point 96°–98° C., sold by Uniroyal Chemical Co., Middlebury, Conn. The additives are usually masterbatched with polymer blends prior to blending with the magnetic or magnetizable powders, and can be present independently up to 10 or 20 parts by weight per 100 parts of the polymer blend and preferably from about 1 to 5 about parts per 100 parts by weight of the polymer blend.

The above blends of polymers form a suitable binder blend or composition which has a low specific gravity of 1.0 or less, desirably 0.97 or less, and preferably from about 0.85 to about 0.95. Moreover, the binder blends of the present invention are environmentally friendly inasmuch as they are substantially free of any halogen containing compounds. That is, they generally contain less than 5 percent by weight, desirably less than 2.5 or 2.0 percent by weight, and preferably less than 1.5, 1.0 or 0.5 percent by weight of any halogen containing compounds based upon the total weight of the low specific gravity polymer blend.

The polymeric blends of the present invention have several advantages including low specific gravity, good flexibility at high magnetic or magnetizable particle loadings, the production of smooth sheets or extruded materials, low shrinkage as well as low crystallinity, generally a low or suitable viscosity on processing equipment, and the like. Since the polymeric blends of the present invention are generally thermoplastic, scrap or waste can be readily recycled and reprocessed.

The polymer blends of the present invention are well suited for use as a binder for magnetic or magnetizable properties. Generally, any type of iron or ferrite compositions or particles can be used with preferably strontium ferrite and/or barium ferrite being used. An advantage of the present invention is that the magnetic blend composite contains high loading values of the ferrite particles such as from about 45 to about 75 percent, desirably from about 50 to about 70 percent, and preferably from about 55 to about 65 percent by volume based upon the total volume of the ferrite particles and the polymeric blend.

In lieu of ferrite particles, the binders can contain rare earth magnet or magnetizable particles. By the term "rare earth magnet or magnetic material," it is meant any magnetic material or magnetizable material which contains at least one rare earth element therein, that is an element having an atomic number of from 57 to 71. Such elements can be contained in either minor or major amounts. Such rare earth magnets can contain minor or major amounts of non rare earth elements such as iron, cobalt, nickel, boron, and the like. Another definition of rare earth magnetic materials are compositions, that is alloys and/or mixtures, containing one or more rare earth elements which generally have good magnetic properties, that is magnetic properties such as generating a magnetic force which is greater than that obtained utilizing conventional non-rare earth magnets such as alloys of nickel, iron, and cobalt. Often times the residual induction value $(B_r)$ of the rare earth magnets is 25 percent greater than that generated by conventional non-rare earth magnet materials such as barium ferrite.

Rare earth magnets are described in various articles and especially in patents such as U.S. Pat. No. 4,496,395 to Croat, U.S. Pat. No. 4,558,077 to Gray, U.S. Pat. No. 4,597,938 to Matsuura et al., U.S. Pat. No. 4,601,875 to Yamamoto et al., U.S. Pat. No. 4,684,406 to Matsuura et al., European patent application No. 108,474 to General Motors, and European patent application Nos. 106,948 and 134,304 to Sumitomo Special Metals Company Ltd., all of which are hereby fully incorporated by reference with regard to the rare earth magnet compositions, methods of preparation, and the like disclosed therein.

A preferred type of rare earth magnet can contain alloys of neodymium or praseodymium in combination with iron and boron, as in elementary ratios of 2 moles of neodymium to 14 moles of iron to 1 mole of boron, all as described in U.S. Pat. No. 4,558,077. More specifically, the primary phase of magnetic alloys is believed to have the composition $RE_2\text{-}Fe_{14}B$ with a preferred composition being in the range of $RE_{0.12\text{-}0.15}B_{0.04\text{-}0.09}Fe_{bal}$ (atomic-fractions). RE is a rare earth element, preferably neodymium or praseodymium. Die upset oriented alloys of the above-noted neodymium, iron, boron, and optional cobalt alloys can also be utilized and such magnets or powders thereof are generally well known to the art and to the literature and are commercially available. Alloys of the same containing small amounts of the compounds such as aluminum, gallium, copper, iron, zirconium, titanium, and the like, can also be utilized.

Another preferred type of rare earth magnet is an alloy of samarium and cobalt as in a mole ratio of approximately 1 to 17. Typical formulations include $SmCo_5$ type magnets, $SM_2(Co,Cu)_{17}$, and the like. A description of such samarium-cobalt magnets are described in *Science*, Volume 28, May 23, 1980, pages 880–894; K. J. Strnat, J. Magn., Magn. Mater. 7 (1978), 351; A. Menth, H. Nagel, R. S. Perkins, Ann. Rev. Mater. Sci. 8 (1978), 21; and J. D. Livingston "General Electric—Technical Info. Series," Report No. 80, CRD 139, July 1980, all of which are fully incorporated by reference. Other suitable rare earth magnets are made from alloys of samarium, cobalt, and iron wherein the iron is generally present in small amounts. Still other rare earth magnet alloys contain dysprosium and cobalt.

A large class of rare earth magnet or magnetic materials are various alloys of iron, boron, at least one rare earth element, and optionally cobalt. In the three component system, the amount of boron is generally from about 2 percent to about 28 percent by weight, the amount of the one or more rare earth elements is from about 8 percent to about 30 percent by weight, with the remaining balance being iron. When cobalt is utilized, the amount of the one or more rare earth elements is from about 8 to about 30 percent by weight, the amount of boron is from about 2 to about 28 percent by weight, cobalt is utilized in an amount of from about 0.1 to about 50 percent by weight, and the balance is iron.

Other rare earth magnet compositions are set forth in "Rare Earth Permanent magnets," E. A. Nesbitt and J. H. Wernick, Academic Press, New York, 1973, which is hereby fully incorporated by reference. Other rare earth patents are set forth in U.S. Pat. Nos. 4,869,964, 4,988,755, 5,051,200, and 5,173,206, which are hereby fully incorporated by reference with regard to all aspects thereof.

The amount of the rare earth magnet or magnetizable particles is generally high, such that generally from about 55 to about 70 percent, desirably from about 58 to about 65 and preferably from about 55 to about 62 percent by volume can be utilized based upon the total volume of the rare earth particles and the polymer blend.

Regardless of whether rare earth particles are utilized or ferrite particles, the sizes thereof are generally small with smaller sizes, i.e., from about 0.2 or 0.5 to about 3.0 or 5.0 with from about 1 micron to about 1.5 micron being preferred.

The various magnetic or magnetizable particles and the polymer binder are mixed in any conventional mixer such as a Banbury at suitable temperatures. For example, the polymer binder masterbatch and the various ferrite or rare earth particles are mixed together under sufficient temperatures generally above the softening point of the semicrystalline polyolefin to thoroughly disperse the magnetic material therein. Once mixing has been completed, the magnetic containing polymeric blend or binder, i.e., composite, can be granulated and subsequently formed into any desired shape or form as through extrusion, molding, and the like.

The invention will be better understood by reference to the following examples which serve to illustrate but not to limit the scope of the present invention.

EXAMPLES

Two controls as well as two examples utilizing the polyethylene-vinyl acetate copolymers of the present invention with a polysiloxane lubricant were made according to the recipes set forth in Table I.

TABLE I

| Polymer Blend Components | Trade Name | Sp. Gr. | Control A | Control B | Ex. 1 | Ex. 2 |
| --- | --- | --- | --- | --- | --- | --- |
| Polyethylene Vinyl Acetate | DQDA 1868NT7 | 0.94 | — | — | 38 | 38 |
| Chlorosulfonated Polyethylene | Hypalon 45 | 1.05 | 70 | 69 | — | — |
| Polyisobutylene | Vistanex | 0.92 | 30 | 31 | 60 | 60 |
| Polysiloxane (Tape) | SE 6250 | 1.16 | — | — | 2 | 2 |
| Ditearyl Pentaerythritol Diphosphite | Weston 619 | 0.92 | — | — | 1 | 1 |

The polymeric blend was prepared by adding all of the components to a mill and heating the same to a temperature of approximately 5° or 10° C. above the softening point of the polyisobutylene and mixing for approximately 10 minutes. The controls relate to the heretofore standard ferrite binder recipe which utilizes chlorosulfonated polyethylene.

The above polymer blends were mixed with strontium ferrite in amounts as set forth in Table II.

TABLE II

| Example | Specific Gravity | Strontium Ferrite | Specific Gravity of Composite Containing Strontium Ferrite |
| --- | --- | --- | --- |
| Control A | 1.07 | 100 | 3.579 |
| Control B | 1.09 | 100 | 3.568 |
| Example 1 | 0.931 | 100 | 3.537 |
| Example 2 | 0.931 | 100 | 3.498 |

The preparation of the high ferrite loaded polymeric blends set forth in Table II was achieved by adding the polymeric blend and the strontium ferrite generally all at once to a mill having a temperature of 200° F. and mixing for approximately 10 minutes.

As apparent from Table II, the formulations of the present invention have a much lower specific gravity than the heretofore commonly used binder of the industry, that is, Controls A and B.

The various examples were then tested with regard to tensile strength, elongation as well as aging properties thereof.

The polymeric binders of the present invention had similar comparative properties with the controls and also had similar magnetic properties.

While in accordance with the Patent Statutes, the best mode and preferred embodiment has been set forth, the scope of the invention is not limited thereto, but rather by the scope of the attached claims.

What is claimed is:

1. A flexible magnetic blend composite, comprising;

ferrite magnet or magnetizable particles, rare earth magnet or magnetizable particles, or combinations thereof, and a polymeric binder blend, said binder blend comprising;

a semicrystalline polymer, a rubbery polymer, and a silicone elastomer lubricant, the melt index of said semi-crystalline polymer being from about 0.5 to about 20, and said rubbery polymer comprising polyisobutylene having a viscosity average molecular weight of from about 800,000 to about 3,000,000.

2. A flexible magnetic blend composite according to claim 1, wherein said semicrystalline polymer is polyethylene-vinyl ester, polybutene, or polypentenamer, or combinations thereof, wherein the amount of said semicrystalline polymer is from about 25 percent to about 55 percent by weight and wherein the amount of said rubbery polymer is from about 45 percent to about 75 percent by weight based upon the total weight of said semicrystalline polymer and said rubbery polymer, and wherein said silicone elastomer is a polysiloxane.

3. A flexible magnetic blend composite according to claim 2, wherein the amount of said semicrystalline polymer is from about 30 to about 50 percent by weight, wherein the amount of said rubbery polymer is from about 50 to about 70 percent by weight, and wherein the amount of said polysiloxane is from about 0.25 to about 8 parts by weight per 100 parts by weight of said semicrystalline polymer and rubbery polymer.

4. A flexible magnetic blend composite according to claim 3, wherein the amount of said polysiloxane is from about 0.75 to about 3 parts by weight per 100 parts by weight of said semicrystalline polymer and said rubber polymer.

5. A flexible magnetic blend composite according to claim 3, wherein said particles are ferrite particles and wherein the specific gravity of the polymeric binder is 0.95 or less.

6. A flexible magnetic blend composite according to claim 3, said particles are rare earth particles and wherein the specific gravity of the polymeric binder is 0.95 or less.

7. A flexible magnetic blend composite according to claim 1, wherein said particles are ferrite particles and wherein the specific gravity of the polymeric binder is 1.0 or less.

8. A flexible magnetic blend composite according to claim 1, wherein said particles are rare earth particles and wherein the specific gravity of the polymeric binder is 1.0 or less.

9. A flexible magnetic blend composite, comprising:

ferrite magnet or magnetizable particles, rare earth magnet or magnetizable particles, or combinations thereof, and a thermoplastic binder blend, said thermoplastic binder blend comprising a semicrystalline polymer, a rubber polymer, and a lubricant, said semicrystalline polymer being a polyethylene-vinyl ester, polybutene, or polypentenamer, or combinations thereof, wherein the total number of carbon atoms in said vinyl ester is from 2 to 6, said rubbery polymer comprising a polyisobutylene having a viscosity average molecular weight of from about 800,000 to about 3,000,000, and said lubricant comprising a silicone elastomer.

10. A flexible magnetic blend composite according to claim 9, wherein the amount of said semicrystalline polymer is from about 25 percent to about 55 percent by weight and the amount of said rubbery polymer is from about 45 percent to about 75 percent by weight based upon the total weight of said semicrystalline polymer and said rubbery polymer.

11. A flexible magnetic blend composite, according to claim 10, wherein said semicrystalline polymer is polyethylene-vinyl acetate wherein the amount of ethylene repeat units in said polyethylene-vinyl acetate is from about 60 to about 95 percent by weight, wherein the amount of said polyethylene-vinyl acetate is from about 30 to about 50 percent by weight, wherein the amount of said polyisobutylene is from about 50 to about 70 percent by weight, and wherein the amount of said lubricant is from about 0.25 to about 8 parts by weight per 100 parts by weight of said semicrystalline polymer and said rubbery polymer.

12. A flexible magnetic blend composite according to claim 11, wherein the amount of said ethylene vinyl acetate is from about 35 to about 45 percent by weight, wherein the amount of said polyisobutylene is from about 55 to about 65 percent by weight and has a viscosity average molecular weight of from about 1.8 million to about 2.4 million, wherein said lubricant is a polysiloxane, and wherein the amount of said polysiloxane is from about 0.75 to about 3 parts by weight per 100 parts by weight of said polyethylenevinyl acetate and said polyisobutylene.

13. A flexible magnetic blend composite according to claim 12, wherein said blend has a specific gravity of from about 0.85 to about 0.95 and is substantially free of halogen.

14. A flexible magnetic blend composite according to claim 9, wherein said blend has a specific gravity of less than 1.0.

* * * * *